Aug. 4, 1936.  E. PUGH  2,049,924

TESTING APPARATUS

Filed June 9, 1934

INVENTOR
E. PUGH
BY H. A. Whitehorn
ATTORNEY

Patented Aug. 4, 1936

2,049,924

UNITED STATES PATENT OFFICE 2,049,924

TESTING APPARATUS

Emerson Pugh, Downers Grove, Ill., assignor to Western Electric Company, Incorporated, New York, N. Y., a corporation of New York Application June 9, 1934, Serial No. 729,745

8 Claims. (Cl. 175—183)

This invention relates to a testing apparatus and more particularly to an apparatus for testing characteristics of electrical conductors.

In testing the concentricity of tubular conductors, such as cable sheaths, where the conductivity is used as a measure of concentricity, errors frequently arise due to the fact that the conductivity varies not only with the thickness of the walls of the sheath but also with the temperature of the sheath.

An object of the invention is to provide an effective apparatus for accurately testing characteristics of an electrical conductor.

In accordance with one embodiment of the invention, a compensating device responsive to temperature is associated with an apparatus for testing the concentricity of a cable sheath.

Other objects and advantages will appear as the description proceeds.

Figure 1:
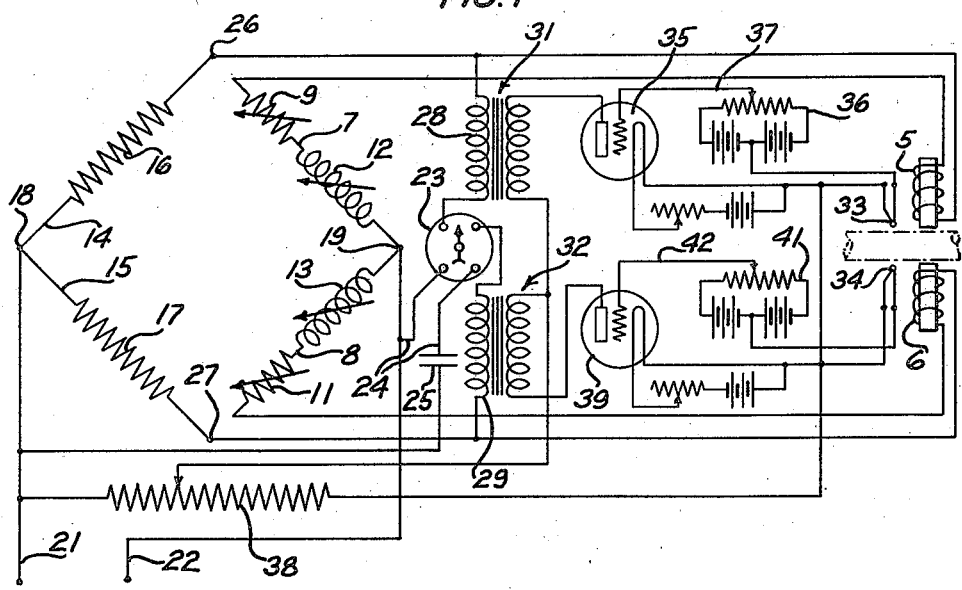
Figure 2:
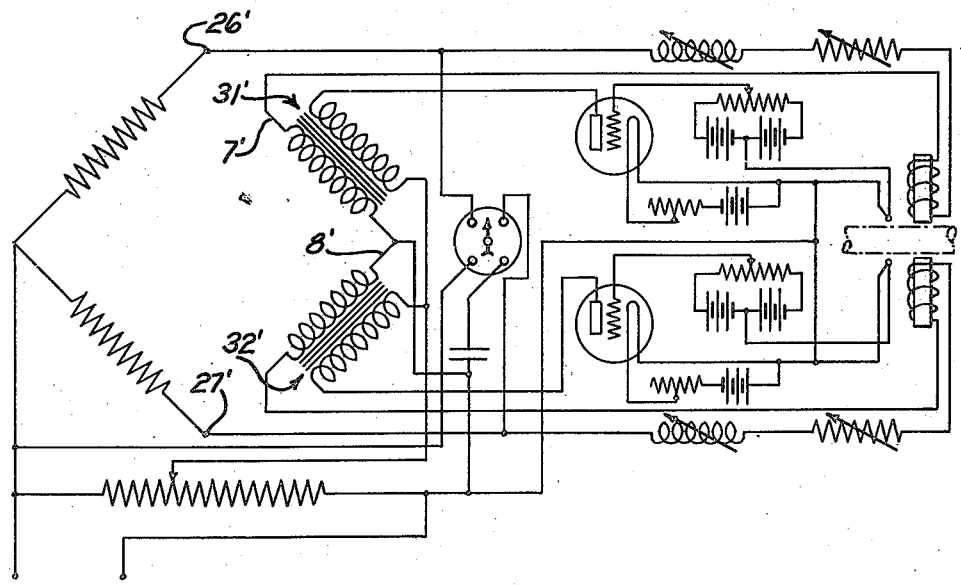

A complete understanding of the invention may be had by reference to the following description taken in conjunction with the accompanying drawing, in which Fig. 1 is a circuit diagram of an apparatus embodying the invention, and Fig. 2 is a circuit diagram of a modified form of the invention.

In the manufacture of lead covered telephone cables, a group or cable of wires is passed through the nozzle of a lead press and a lead sheath is extruded over the cable in a hot, plastic state. The lead sheath extruded around the cable should be concentric, that is, the thickness of the walls of the sheath should be uniform on all sides of the cable. In order to determine this uniformity or concentricity of the sheath, a pair of coils 5 and 6 are placed on diametrically opposite sides of the cable a short distance from the extrusion nozzle. The coils 5 and 6 may be provided with laminated cores, as more fully disclosed in the patent to Guillemin 1,815,710, July 21, 1931.

The coils 5 and 6 are included in complementary arms 7 and 8 of a Wheatstone bridge circuit. The arms 7 and 8, in addition to including the coils 5 and 6, respectively, are also provided with variable resistances 9 and 11 and variable inductances 12 and 13 so that the reactance, as well as the resistance, of these arms may be balanced against each other. The opposite arms 14 and 15 preferably include only resistances 16 and 17. Alternating current is supplied to the input points 18 and 19 of the bridge through conductors 21 and 22 which lead to an alternating current source (not shown). It will thus be seen that when the bridge is energized, an alternating current will flow in the coils 5 and 6 and currents will be induced in the cable sheath causing the impedance of these coils to vary in accordance with the resistance of that portion of the cable sheath lying adjacent the faces of the cores of these coils; and since the resistance of a portion of the cable varies as the thickness of the sheath at that portion, the resistance variation may be used as a measure of the relative thickness of the portions of the cable adjacent the coils 5 and 6. As long as the portions of the cable adjacent the faces of the cores of coils 5 and 6 are equal, the bridge will be balanced. However, as soon as the thickness becomes unequal, the bridge will be unbalanced in one direction or the other. The unbalance of the bridge is indicated by a galvanometer 23 having a high resistance or potential winding and a low resistance or current winding, either one of which may be the rotor or stator winding. The high resistance winding is connected by conductors 24 to the source of alternating current for energizing the bridge. A condenser 25 may be placed in series with this winding to correct the power factor. The low resistance winding of the galvanometer is connected to the output points 26 and 27 of the bridge and has a pair of coils 28 and 29 in series therewith which are the secondary windings of transformers 31 and 32. Due to the two windings of the galvanometer, the galvanometer pointer will move to the right or left of the zero point as the phase relationship of the input to the bridge and the output of the bridge varies through an angle of 180° in passing through the zero point. This provides an indication as to whether the sheath is thicker adjacent the coil 5 or thicker adjacent the coil 6.

It has been found in connection with measuring the concentricity of cable in this manner that certain errors arise due to the fact that the lead in the sheath may be hotter on one side of the sheath than on the other; and since the resistance of lead varies with temperature, as well as with mass, the temperature must be taken into consideration in arriving at an accurate determination. For this purpose two thermocouples 33 and 34 are located adjacent the cores of coils 5 and 6, preferably in alignment with the cores longitudinally of the cable. One conductor of the thermocouple 33 is connected to the filament circuit of an electronic tube 35 and the other terminal is connected to a potentiometer circuit 36. The grid of this tube is connected to the potentiometer through a conductor 37 and any suitable bias, preferably a negative bias, may be placed on the grid relative to the filament by shifting the movable contact of the potentiometer circuit. The anode circuit of tube 35 includes the primary winding of transformer 31 and is connected across a potentiometer resistance 38, which, in turn, is connected across a source of alternating current for energizing the circuit. One lead of the thermocouple 34 is similarly connected to the filament of an electronic tube 39, while the other lead is connected to a potentiometer circuit 41 connected to the grid of this tube by a lead 42. The anode circuit of tube 39 includes the winding of transformer 32 and is also connected to the potentiometer resistance 38. Transformers 31 and 32 are connected to the galvanometer circuit at an opposing relation so that when the temperatures of thermocouples 33 and 34 are equal, the potentials impressed upon the grids of tubes 35 and 39 will be equal. At such time the current flowing in the anode circuits of the tubes will also be equal and the voltages induced in the galvanometer circuit through transformers 31 and 32 will balance out. However, when one of the thermocouples 33 and 34 generates a greater potential than the other, the galvanometer will be affected to compensate for any error in the reading of the galvanometer, resulting from the metal under one of the coils being at a different temperature than the metal under the other coil.

The embodiment of the invention shown in Fig. 2 is substantially identical with that shown in Fig. 1 except that transformers 31' and 32' are placed directly in the arms 7' and 8' of the bridge circuit. The low potential winding of the galvanometer is then placed directly across the output terminals 26' and 27' of the bridge circuit.

While the invention has been described particularly in connection with the determination of the concentricity of lead covered telephone cables, it will be evident that the invention is not limited to such an application, and that many changes and modifications may be made in the details of construction without departing from the spirit and scope of the invention.

What is claimed is:

1. In an apparatus for testing a conductor, a pair of testing coils for receiving a conductor between them, a bridge circuit including said coils in complementary arms thereof, an indicating device associated with said bridge circuit, and temperature responsive means associated with said test coil for modifying the operation of said indicating device in response to the temperature of said conductor.

2. In an apparatus for testing a moving conductor, a pair of test coils positioned circumferentially of the conductor to be tested, a bridge circuit including said coils in complementary arms thereof for determining the conductivity of said conductor, a temperature responsive device associated with each of said coils for determining the temperature of said conductor, and means for indicating the combined result of said determination.

3. In an apparatus for testing a conductor, a pair of test coils positioned circumferentially of the conductor to be tested, a bridge circuit including said coils in complementary arms thereof, a thermocouple associated with each of said coils for determining the temperature of the conductor, means for energizing said coils to set up currents in said conductor to determine the conductivity thereof, and an indicating device responsive to the combined determinations of conductivity and temperature.

4. In an apparatus for testing a conductor, a pair of test coils positioned circumferentially of the conductor to be tested, a bridge circuit including said coils in complementary arms thereof, a temperature responsive device associated with each of said coils, a pair of electronic tubes, each having a grid, cathode and anode, grid circuits including said temperature responsive devices, indicating means connected to said bridge circuit, and anode circuits associated with said indicating means for modifying the action thereof in accordance with the temperature of said conductor.

5. In an apparatus for testing a conductor, a test coil positioned adjacent the conductor to be tested for determining a characteristic thereof, a temperature responsive device associated with said test coil, an electronic relay connected to said device, and an indicating means responsive to said characteristic and to the output of said relay.

6. In an apparatus for testing a conductor, a pair of test coils for receiving a conductor to be tested therebetween, means for energizing said coil, an indicating means responsive to the differential effect of said coils adjacent said conductor, temperature responsive means associated with said coils, and means for differentially affecting said indicating means in accordance with the difference in temperature at said temperature responsive means.

7. In an apparatus for testing a conductor, means for inducing a current in the conductor for determining a characteristic thereof, means responsive to the inducing current for indicating said characteristic, and temperature responsive means associated with said current inducing means for modifying the operation of said indicating means in response to the temperature of the conductor.

8. In an apparatus for testing a conductor, means for generating a current in the conductor to determine a characteristic of the conductor, an electronic relay associated with said means, and means for modifying the operation of said relay in response to the temperature of said conductor.

EMERSON PUGH.